United States Patent [19]

Waller et al.

[11] Patent Number: 4,547,812
[45] Date of Patent: Oct. 15, 1985

[54] METHOD AND APPARATUS FOR FORMING HIGH RESOLUTION HALFTONE IMAGES

[75] Inventors: Robert W. Waller, Northridge; Dean W. Anschultz, Canoga Park, both of Calif.

[73] Assignee: Information International, Inc., Culver City, Calif.

[21] Appl. No.: 333,385

[22] Filed: Dec. 22, 1981

Related U.S. Application Data

[63] Continuation-in-part of Ser. No. 151,660, Jun. 20, 1980, abandoned, which is a continuation of Ser. No. 924,640, Jul. 14, 1978, abandoned.

[51] Int. Cl.⁴ .............................................. H04N 1/40
[52] U.S. Cl. .................... 358/283; 358/298; 364/523
[58] Field of Search ............ 358/283, 256, 298; 364/523

[56] References Cited

U.S. PATENT DOCUMENTS

| | | | |
|---|---|---|---|
| 3,806,641 | 4/1974 | Crooks | 358/283 |
| 3,922,484 | 11/1975 | Keller | 358/256 |
| 3,983,319 | 9/1976 | Moe | 358/283 |
| 4,123,778 | 10/1978 | Graf | 358/107 |

*Primary Examiner*—Howard W. Britton
*Attorney, Agent, or Firm*—Freilich, Hornbaker, Rosen & Fernandez

[57] ABSTRACT

Halftone images are formed from dots selected from a dot character font memory storing information representing halftone dots of different sizes and shapes corresponding to different gray scale tone values or image densities. An original image is first scanned to sample its tone values at minute intervals exceeding the desired dot resolution of the reproduction. These sample values are digitized by an A/D converter which converts them to multibit binary numbers. Adjacent samples are compared to determine the average image density in a particular area, as well as the rapidity of rate of change of image density within that area. If the rate of change of image density in a given area is below a selected threshold value, the area is designated as low detail and the multibit binary number representing the result of the average density calculation over the area is used to select a dot character from the font memory for reproducing that area of the image. If, however, the rate of change of image density exceeds the selected threshold value, indicating an area of relatively high detail, the area samples are used to select special dot shapes and positions for use in reproducing that sampled area. This technique achieves a higher resolution halftone image for a given amount of stored data than prior techniques, as well as achieving a higher "apparent" resolution to the observer.

22 Claims, 14 Drawing Figures

| ORIGINAL IMAGE | HALFTONE REPLICA | |
|---|---|---|
|  |  | Fig. 2(c) |
|  |  | Fig. 2(d) |
|  |  | Fig. 2(e) |
|  |  | Fig. 2(f) |

ORIGINAL IMAGE

HALFTONE REPLICA

METHOD AND APPARATUS FOR FORMING HIGH RESOLUTION HALFTONE IMAGES

RELATED APPLICATIONS

This application is a continuation-in-part of application Ser. No. 151,660, filed June 20, 1980 now abandoned, which is a continuation application of Ser. No. 924,640, filed July 14, 1978, now abandoned.

BACKGROUND OF THE INVENTION

The printing techniques commonly used in the graphic arts industry, i.e., newspapers, books, etc., utilize an all-or-nothing inking procedure; i.e., ink is either deposited at each point on the printing surface or it is not. While this technique poses no problems when it is desired to print text, the printing of pictures, such as photographs, introduces the problem of printing the continuous tones in the gray scale ranging from black to white. The problem is generally solved by transforming the continuous tones of the original image into halftones. Halftone images are typically produces by a large number of inked dots whose size or spacing relative to one another tricks the eye into perceiving shades of gray rather than the individual dots. This technique works best when the largest dots and the spacing between the dots is small compared with the visual acuity of the eye. Early halftone generating systems used either variable sized dots with uniform spacing or uniform sized dots with variable spacing.

Electronic phototypesetting systems developed over the years have greatly increased the speed of type composition. Many such systems incorporate a halftone generating capability and in addition to storing typeface characters in a font memory also store halftone dot characters representative of discrete levels of the gray scale. In order to produce a halftone image, these systems scan the original image, sample the gray scale value at discrete intervals and convert these values to multibit binary numbers which are then used to access the stored dot character representative of that value from the dot character font memory. U.S. Pat. No. 3,806,641 to Crooks discloses a system of this type.

The data processing capabilities of such electronic phototypesetting systems have made possible a drastic reduction in the time necessary to prepare plates for printing material comprised of both text and illustrations. However, the resolution of halftone images produced by such sampled data systems generally falls short of that obtainable when non-digital techniques are employed.

SUMMARY OF THE INVENTION

The present invention is directed to a system for extracting digital information from original images storing that information and/or transmitting the information to a remote location, and then utilizing the information to produce a halftone replica of the original image. The invention is particularly useful in a photocomposing system in which digital information representing a large number of pictures is stored in a mass memory such as magnetic tape or disk and used together with other information to compose pages of text and pictures.

A photocomposing system in accordance with the invention is capable of producing halftone replicas of higher apparent resolution for a given mesh value than previously known systems utilizing a pure sampled data approach. Alternatively, a photocomposing system in accordance with the invention can produce halftone replicas of given resolution with lower data storage requirements than previously known systems.

In accordance with the present invention, the image to be reproduced is scanned by methods well-known in the art to obtain digital representations of the tonal values of incremental areas thereof. However, unlike prior systems, the image is scanned at a greater number of horizontal and vertical coordinate points than is desired in the halftone replica. For example, by doubling the number of horizontal and vertical sampling points, four samples rather than one are taken for each discrete area or dot cell interrogated by the scanner. The four samples are then compared with one another to determine the rate of change of image density within the area or dot cell. If a threshold value is not exceeded, the cell is deemed a low detail cell. If, on the other hand, the threshold value is exceeded, the cell is deemed a high detail cell.

A photocomposing embodiment of the invention is comprised of an image read subassembly which extracts tonal density data from the original image and an image record subassembly which responds to the density data to produce the halftone replica. In a preferred embodiment, the image read subassembly determines whether a cell is of high or low detail. In the case of a low detail cell, the four individual samples are averaged to develop a single density value for the cell which is then placed in a memory, e.g. magnetic tape. In the case of a high detail cell, all four of the cell samples are recorded on the magnetic tape.

In accordance with a first embodiment, the image record subassembly subsequently responds to the information on the magnetic tape to select a single dot character from a font memory which best represents the original four individual samples. In the case of a low detail cell, the stored single density value is employed to select the dot character of appropriate size from the font memory. In the case of a high detail cell, the four samples are processed to select the dot character of appropriate size and shape from the font memory. In addition, the four samples are used to migrate, i.e., alter the position in the cell at which the dot character is placed. The position can be either the "center of gravity" of the four, in terms of average density, or some other function relating the desired displacement from cell center ($\Delta X$, $\Delta Y$) to the magnitude and position of the four samples. Experimentation has shown that good results are obtained by calculating $\Delta X$ and $\Delta Y$ as follows:

$$\Delta X = K_1 L (D_E - D_W)$$

$$\Delta Y = K_2 L (D_N - D_S)$$

where L equals the distance from the center of the cell to the sample locations; $D_N$, $D_W$, $D_E$, $D_W$ equal the image densities of four samples oriented at 90° to one another within the cell (e.g., north, south, east, west) and $K_1$ and $K_2$ are constants.

In accordance with an alternative embodiment of the invention, the multiple samples associated with a high detail cell are used by the image record subassembly to select multiple dot characters, or a dot character cluster, to replicate the high detail cell.

The novel features of the invention are set forth with particularity in the appended claims. The invention will

DESCRIPTION OF A DETAILED EMBODIMENT

Halftone replicas of original images are formed by the juxtaposition of discrete dot character which may seemingly be of arbitrary shape, such as small dots or line segments. Multiple dot characters when juxtaposed together can be configured to give an impression of continuous gray scale tones comprising a halftone image.

Digital memories have been used to store the shapes of such discrete dot characters. More particularly, a font memory is typically provided in a halftone recording system for storing the shapes of various dot characters generally selected so as to cover the entire gray scale from white to black in selected steps. Such dot characters have been utilized in prior art systems, and examples are disclosed in various U.S. Pat. Nos. 3,806,641 to Crooks, and 3,922,484 to Keller. The present invention similarly makes use of dot characters of various sizes and shapes which are stored in and retrieved from a dot character font memory.

As will be more fully explained hereinafter, the dot characters are preferably arranged in the font memory in order of increasing or decreasing image density. This arrangement offers the simplest access to the dot characters because the apparatus used to scan the original image converts tonal density to a multibit binary number proportional to that density Thus, the multibit binary number can be used as a direct address to gain access to the dot character font memory in order to call out the appropriate dot character.

Any halftone generating system must begin by extracting information from the original image to be reproduced. Similarly to prior art systems, the present invention extracts the required tonal density information from the original image by a scanning process. Prior to considering the scanning apparatus depicted in FIG. 1, attention is initially directed to FIG. 2a which illustrates a pattern comprised of imaginary lines running at 45° to the vertical and intersecting one another to form a matrix of cells 12. The cells 12 may be considered as being arranged in rows and columns such that any particular cell falls within a particular row and column. For example, cell 14 is in column 5 and row 3. Although the cell matrix or mesh depicted in FIG. 2a is formed by lines extending at 45° to the vertical, it should be understood that other cell matrices can also be employed, as is readily known in the art. The significance of the cell matrix depicted in FIG. 2a is that the original image to be ultimately reproduced by a halftone replica is first scanned to determine its tonal density within each of the discrete cell areas. More particularly, as will be discussed in greater detail hereinafter, the image read apparatus of FIG. 1 scans an original image which may be borne on a transparency 16 by successively sampling the cells in accordance with the pattern represented by the matrix depicted in FIG. 2a. Subsequently, the image record subassembly depicted in FIG. 3 produces a halftone replica of the original image by recording an appropriate dot character in each cell.

It should be apparent that as the number of dot cells (FIG. 2a) into which the original image is divided is increased (increasing the mesh value as it is called in graphic arts), the resolution of the halftone replica to be produced will also be increased. In typical prior art systems, in order to increase the resolution of the halftone replica, it is necessary to commensurately increase the amount of data which must be stored and processed. That is, in order to double the resolution of the halftone replica in accordance with prior art systems, the amount of data which must be stored and processed is quadrupled since the number of points scanned in the original image must be doubled in both the horizontal and vertical dimensions. Moreover, to do so may result in a halftone replica which is not readily printable.

In accordance with a significant feature of the present invention, each dot cell 12 of the original image is sampled at multiple points and the resulting multiple samples are processed to yield a single dot character which more accurately represents the density of the original image within that cell area than prior art systems.

More particularly, attention is directed to FIG. 2b which represents a single cell 12. In accordance with the present invention, the cell is sampled at multiple points. In accordance with the exemplary embodiment disclosed herein, it will be assumed that each dot cell 12 is sampled at four points displaced from one another by substantially 90°. The four points will be respectively referred to herein as north, east, south, and west. The terms $D_N$, $D_E$, $D_S$, and $D_W$ will be used hereinafter to respectively represent the tonal densities of the north, east, south and west points of a dot cell area and additionally these terms may sometimes be used to designate the particular multibit binary number representative of that tonal density. Whereas prior art systems typically sample each dot cell at a single point, a system in accordance with the present invention samples each dot cell at multiple points, e.g. the four points illustrated in FIG. 2b. As will be seen hereafter in discussing the apparatus of FIGS. 1 and 3, the data representing the tonal densities of those four points of the original image in each cell is examined to determine whether the dot cell comprises a high or low detail portion of the image. The determination of whether a cell comprises a high or low detail portion of the image is based upon comparing the four density values to determine the rate of change of image density within the cell. This determination can be made by, for example, calculating the ratios or differences between the density values. If the rate of change exceeds a certain threshold, then the data corresponding to that cell is tagged with a high detail "flag" and the four density values are recorded and preserved for use in developing the halftone replica. On the other hand, if a cell is determined to be a low detail cell, then the four density values are processed to derive a single value which, in the simplest embodiment, comprises the arithmetic average of the four density values. The data derived during the image read process is in most applications of the invention recorded on a memory such as a magnetic tape which is later used by the image record subassembly of FIG. 3 to produce the halftone replica. As will be seen hereinafter, in producing the halftone replica, the single density value associated with low detail cells is used to access a dot character of appropriate size from the dot character memory. The four density values associated with a high detail cell are processed in the image record subassembly to derive an address to access a dot character of appropriate size and shape from the dot character memory. Additionally, the four density values associated with a high detail cell are used to determine whether the dot character to be displayed in a cell in the halftone replica should be migrated within the cell. That is, depending upon the relative magnitudes of the four density values within a cell, the dot character displayed within that cell can be displaced horizontally ($\Delta X$) and vertically ($\Delta Y$) from the center of the cell.

Figure 1:
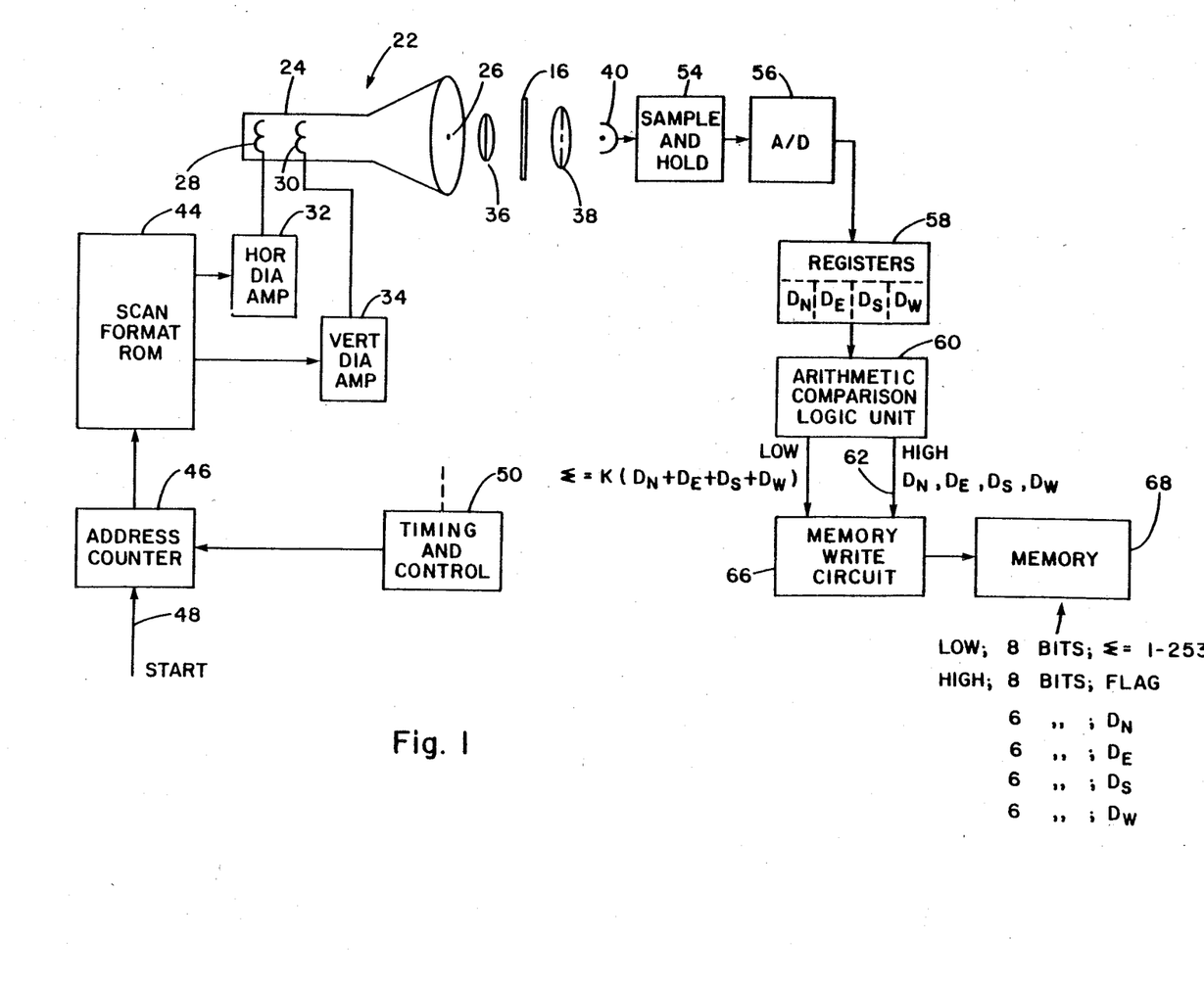
FIG. 1 is a block diagram of the image read subassembly in accordance with the invention.
Figures 2A, 2B:
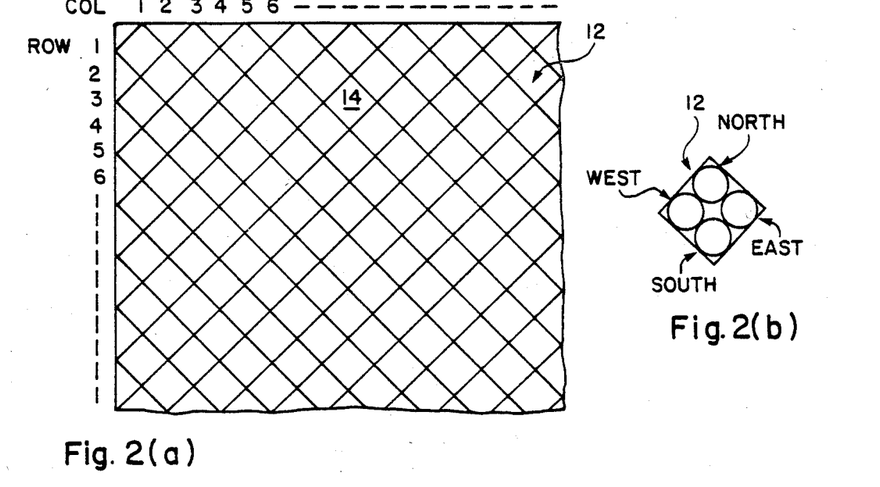
FIG. 2a schematically illustrates the division of an original image into a matrix of dot cells.
FIG. 2b schematically illustrates a single dot cell area showing sampling points therein.
Figure 3:
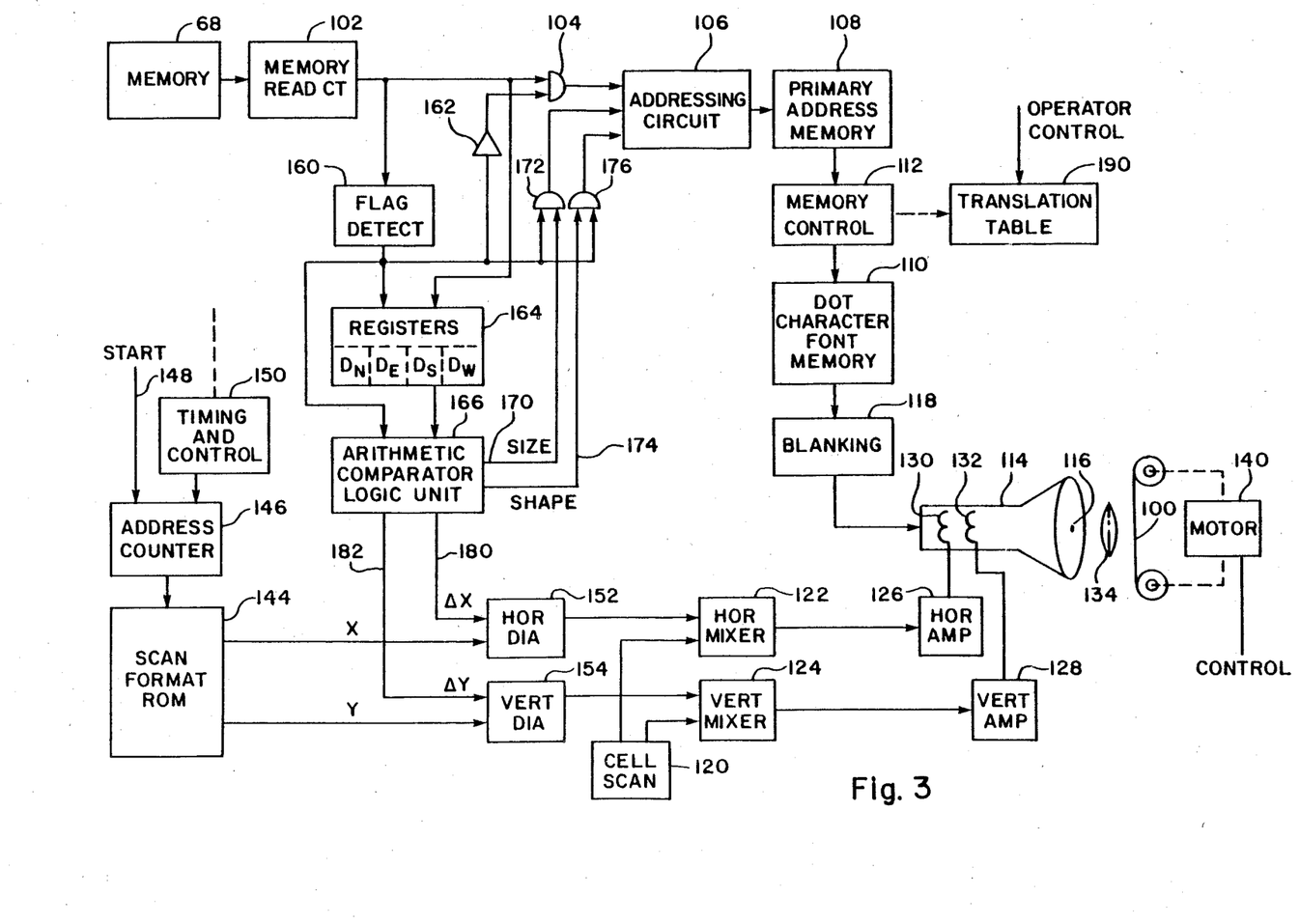
FIG. 3 is a block diagram of an image record subassembly in accordance with one embodiment of the invention for recording a halftone replica.

The halftone image generating system in accordance with the invention essentially operates in two modes; namely (1) an input mode during which the image read apparatus of FIG. 1 scans an original image and extracts density data therefrom and (2) an output mode during which the image record apparatus of FIG. 3 responds to the density data to produce a halftone replica. The input mode will be considered first and reference will initially be made to FIG. 1 which illustrates a photographic transparency 16, bearing the original image to be reproduced. The transparency 16 is placed in front of a scanner 22 which preferably comprises a cathode ray tube 24 capable of producing a spot of light 26 for scanning the transparency 16. The scanning spot 26 is deflected in a manner readily understood in the art under the control of horizontal and vertical deflection coils 28 and 30. The coils 28 and 30 are respectively driven by drive circuits 32 and 34, each of which includes a digital to analog converter and amplifier circuits. The scanning spot 26 is focused by a lens 36 onto the transparency 16. The light penetrating through the transparency 16 is focused by lens 38 onto a photodetector 40 such as a photomultiplier tube which develops an analog signal related to the magnitude of the light passing through the transparency 16 which in turn is determined by the density of the image carried by the transparency. It should be recognized that although it has been assumed the original image is carried on a transparency 16, other types of scanners can be used for scanning opaque film or the like in which the reflected light from the original image causes a photodetector to develop the image signal. Prior to discussing the processing of the image signal produced by photodetector 40, the manner in which the scanning spot 26 is controlled to derive the image signal will be explained.

It will be recalled from FIG. 2a that the original image is to be scanned by successively examining the density of the image in each of a multiplicity of discrete cells 12. In order to cause the spot 26 to move from cell to cell, appropriate deflection signals must be applied to coil 28 and 30. Moreover, within each cell 12, the spot 26 must be successively deflected to the north, east, south and west points depicted in FIG. 2b. One manner of sequentially generating the appropriate deflection signals for application to the coils 28 and 30 is to utilize a read only memory 44 which, in sequential locations, stores digital information representing the deflection signals required to move the spot 26 successively to each cell and within each cell to each point. Thus, the locations of the read only memory 44 can be sequentially accessed in response to an address counter 46. The address counter 46 is enabled by application of a start signal 48 and is then controlled by a timing and control circuit 50. That is, the timing and control circuit 50 will periodically supply a clock pulse to increment the address counter 46. In response to each new count developed by the counter 46, a different location of the read only memory 44 will be accessed to supply digital deflection signals to the drive circuits 32 and 34 to cause the spot 26 to sequentially scan the cells depicted in FIG. 2a and the points depicted in FIG. 2b.

The output of the photodetector 40 is applied to a sample and hold circuit 54 which is also under the control of the timing and control circuit 50. Thus, each time the spot 26 is positioned at a new point, the sample and hold circuit 54 samples the output of the photodetector 40 to store an analog signal which is then applied to an analog to digital converter 56. The output of the analog to digital converter 56 is in turn coupled to storage registers 58 capable of storing at least four multi-bit numbers, $D_N$, $D_E$, $D_S$, $D_W$, respectively representative of the tonal density of the north, east, south and west points of a cell 12. The converter 56 and registers 58 are similarly controlled by the timing and control circuit 50 which enables the registers 58 to accumulate the digital density values of the points of a single cell An arithmetic/comparison logic unit 60 is provided to determine, based upon the values $D_N$, $D_E$, $D_S$, and $D_W$ for a cell, whether the portion of the original image within that cell is comprised of high detail or low detail. This determination is made by comparing the magnitudes of the values $D_N$, $D_E$, $D_S$, and $D_W$ to determine the rate of change of density within the cell area. This determination of rate of change of density within a cell area can be performed in a variety of manners such as determining the ratio or differences between points within a cell. In accordance with one preferred technique, the digital density samples $D_N$, $D_E$, $D_S$, $D_W$ are summed to develop a signal $\Sigma$. The cell is deemed a high detail cell if $$\left(D_N - \frac{\Sigma}{4}\right) \text{ or } \left(D_E - \frac{\Sigma}{4}\right) \text{ or } \left(D_S - \frac{\Sigma}{4}\right) \text{ or } \left(D_W - \frac{\Sigma}{4}\right)$$

is $>T$ where $\Sigma$ equals K $(D_N+D_E+D_S+D_W)$ K defines a constant and T defines a threshold constant. Other criteria can be used to determine whether a cell comprises a high detail cell. For example only, the difference between the highest and lowest valued samples can be compared with some threshold; i.e. D maximum$-$D minimum$>$T.

From the foregoing, it should be apparent that a cell will be deemed a high detail cell if the density value of any of the four points within the cell is greater than the average of the four points by some threshold determined by the value T. It will of course be readily recognized that the arithmetic capability to make the determination in accordance with the foregoing equations is rather simple and that accordingly the arithmetic/comparison logic unit 60 can be readily implemented either by special purpose logic circuitry or by a properly programmed computer. In any event, if the logic unit 60 determines that the cell is a high detail cell, it generates a high detail "flag" signal on output line 62 followed by the digital density values of the cell $D_N$, $D_E$, $D_S$, $D_W$. On the other hand, in the event the logic unit 60 determines that the cell is a low-detail cell, then unit 60 merely outputs a single digital value $\Sigma$ which, as has been pointed out, is related to the sum of the density values $D_N$, $D_E$, $D_S$, $D_W$ for that cell.

The output of the logic unit 60 is applied to a memory write circuit 66 which then records the data in memory 68 which preferably comprises a magnetic tape or magnetic disk drive.

In a typical embodiment of the invention, the single digital value $\Sigma$ representing the density of a cell is represented by eight bits, meaning that 256 density or gray scale levels for that cell can be represented. Inasmuch as in accordance with the preferred embodiment, three of those eight-bit combinations are used as special flags, the eight bits representing $\Sigma$ define 253 different density or gray scale levels. The three reserved eight-bit combinations can be used as follows: code 0 indicates no dot in this cell, code 255 indicates the end of the current row or column of cells, and code 254 indicates a high detail dot cell has been encountered. Thus, the code 254 comprises a high detail "flag" which identifies that the data following represents the digital density values of the four sample points within a cell. In a preferred embodiment, each of the digital density values $D_N$, $D_E$, $D_S$, $D_W$ is represented by six bits. Thus, a high detail cell is represented by 32 bits in the memory 68 while a low detail cell is represented by only eight bits. However, since high detail cells will occur very infrequenly, i.e., only at a sharp edge or transition in the original image, the amount of additional data required to be stored in memory 68 to represent the original image is not much greater than in prior art systems in which only a single point was sampled in each cell. For example, if ten percent of the dot cells in a given image are "high detail", then the total data is increased by only thirty percent over the same image data without the image enhancement yielded by the present invention.

Figure 2C:
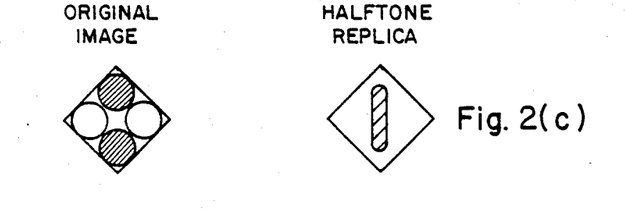
FIG. 2c schematically illustrates an exemplary halftone dot character formed to replicate the original image high detail cell shown, in accordance with a first embodiment of the invention.
Figure 2D:
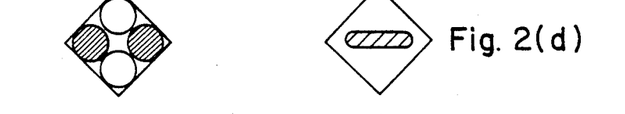
FIG. 2d schematically illustrates a further exemplary halftone dot character formed to replicate the further high detail cell shown in accordance with said first embodiment.
Figure 2E:
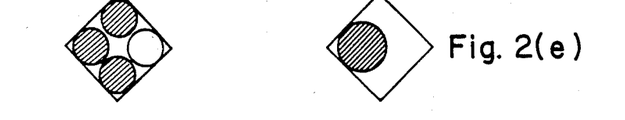
FIG. 2e schematically illustrates a still further exemplary halftone dot character formed to replicate the further high detail cell shown, in accordance with said first embodiment.
Figure 2F:
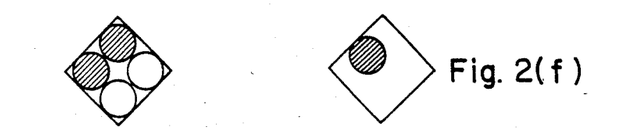
FIG. 2f schematically illustrates a still further exemplary half tone dot character formed to replicate the further high detail cell shown, in accordance with said first embodiment.

Prior to proceeding to an explanation of the image record subassembly of FIG. 3 for executing the output mode, attention is directed to FIGS. 2c-2f which illustrate typical halftone dot characters to be printed on the replica in response to particular original image cells in accordance with a first embodiment of the invention. Consider initially the original image high detail cell of FIG. 2c in which the north and south points are considerably more dense than the east and west points. In order to best represent this original image cell by a single halftone dot character, a dot character having a shape elongated in the vertical direction as shown is used. Similarly, in FIG. 2d a high detail original image cell is represented in which the east and west points have a density considerably greater than the north and south points. The halftone dot character utilized to best represent this original image cell comprises a dot elongated in the horizontal direction. FIG. 2e illustrates an original image cell in which the southwest and north points are of considerably greater density than the east point. The halftone dot character used to represent this original cell configuration comprises a large dot displaced along the horizontal axis of the replica cell. FIG. 2f illustrates an original image dot cell in which the west and north points are of considerably greater density than the east and south points. A halftone dot character, smaller in size than the dot character of FIG. 2e, is shown displaced both vertically and horizontally from the center of the replica cell.

Thus, as should now be apparent from FIGS. 2c-2f, the size, shape, and position of the halftone dot character within a cell of the replica can be selected to best represent a cell of the original image. As will be seen hereinafter, a character font memory is preferably used to store the size and shape of each dot character. This character font memory is similar to that disclosed in the aforecited Crooks U.S. Pat. No. 3,806,641. Although the character font memory theoretically can be of infinite size, thus able to store any desired number of different dot character shapes, it will be assumed herein that the character font memory to be discussed in connection with FIG. 3 stores characters of three different shapes, as represented in FIGS. 2c, 2d, and 2e, with each shape being stored in 253 different sizes. As will be seen hereinafter, the particular dot character to be accessed from the font memory to represent a cell in the halftone replica is determined in part by the previously-mentioned value $\Sigma$ associated with the cell. That is, the size of the dot character used in the replica to represent a cell is determined by the density of the corresponding cell in the original image which of course is dependent upon the sum of the density values $D_N$, $D_E$, $D_S$, $D_W$ for that cell. As will be seen hereinafter, the shape of the dot character to be accessed from the font memory to represent a cell in the replica is determined based upon a comparison of the density values representative of the four points within a cell. Similarly, the displacement from the center of the replica cell is determined based upon a comparison of the density values of the four points within a cell.

Attention is now directed to the image record subassembly of FIG. 3 which executes the previously-mentioned output mode to create a halftone replica which is recorded on film or some other photosensitive medium 100. The image record subassembly develops the halftone replica based upon the data read from memory 68 which, as previously noted, may comprise a magnetic tape or disk. The data stored in memory 68 is read by memory read circuit 102. In the case of a low detail cell, the memory read circuit 102 will read the value Σ which will then be transferred through enabled gate 104 to addressing circuit 106. The value Σ can be used as an address to access a location in primary memory 108 which stores the starting address of a related dot character stored in font memory 110. Font memory 110 stores the information required to form and display each different dot character. It will be recalled that it has been assumed that the preferred embodiment is capable of storing dot characters of three different shapes, each shape being available in 253 different sizes. The information necessary to form each of these dot characters (3×253) is contained in the font memory 110. The information necessary to form a dot character may be contained within a block of addresses within the font memory 110 and the primary address memory 108 contains the starting address for each block of addresses within memory 110. Thus, in the case of a low detail cell in which the value Σ is directly applied to the addressing circuit 106, a starting address will be read out of memory 108 into memory control circuit 112. This starting address then is utilized to read the information from the character font memory 110 required to form that character in a display device such as a cathode ray tube 114. In a preferred embodiment of the invention, the character will be formed on the face of the cathode ray tube 114 by scanning the spot 116 in a regular pattern and by blanking and unblanking the spot based upon the information read from the character font memory. The output of the character font memory 110 is applied to blanking circuit 118 which modulates the intensity of the spot 116. The spot 116 is caused to scan within a particular cell area by signals provided by a cell scanning circuit 120 which supplies analog signals to horizontal and vertical mixer circuits 122 and 124. The outputs of the mixer circuits 122 and 124 are applied to horizontal and vertical deflection amplifiers 126 and 128 whose outputs in turn are connected to deflection coils 130 and 132. A lens 134 focuses the spot 116 on the film 110 which is driven past the face of the cathode ray tube by a motor 140.

The spot 116 is not only scanned within each cell area in response to signals generated by cell scanning circuit 120, but is also of course moved from cell to cell corresponding to the matrix depicted in FIG. 2a. In order to do this, a scan format read only memory 144, similar to the scan format memory 44 discussed in connection with FIG. 1 is provided. The scan format read only memory 144 is driven by an address counter 146 which is enabled by a start signal 148. The address counter is under the control of a timing and control circuit 150. The timing and control circuit 150 similarly controls the other elements of the subassembly of FIG. 3 in a manner well-known in the art to of course synchronize the positioning of the spot 116 within a particular cell with the character information being read from the memory 110 to control the intensity of the spot within the cell. More particularly, in response to a start signal 148, the address counter 146 is enabled and is incremented to cause the read-only memory 144 to generate X and Y positioning signals which are applied to horizontal and vertical digital to analog converters 152 and 154. The outputs of the converters 152 and 154 are applied to mixer circuits 122 and 124 and therethrough to deflection amplifiers 126 and 128. Thus, the X and Y deflection signals supplied by the read-only memory 144 determine the cell position of the spot 116. The scan signals provided by the circuit 120 cause the spot 116 to scan within the cell. As previously pointed out, in the case of a low detail cell read from the memory 68, the value Σ can be directly used as an address by addressing circuit 106 to access an address from the primary address memory 108 to thus cause the font memory to supply the appropriate information to the blanking circuit 118 to draw dot characters of various size on the face of the cathode ray tube 114.

In the case of a high detail dot cell read from memory 68, a flag detect circuit 160 will respond to the high detail flag and disable gate 104 via inverter 162. Further, flag detect circuit 160 will enable registers 164 causing the digital density values $D_N$, $D_E$, $D_S$, $D_W$ following the high detail flag to be read into registers 164. Further, the flag detect circuit 160 will enable arithmetic comparator logic unit 166 which will then operate upon the stored density values $D_N$, $D_E$, $D_S$, $D_W$ to develop size, shape, and displacement information. More particularly, logic unit 166 will develop dot character size information by calculating the value Σ in accordance with $\Sigma = K (D_N + D_E + D_S + D_W)$ where K defines a constant. The value Σ developed by the logic unit 166 is applied via output line 170 to the input of gate 172 which is enabled by the output of the flag detect circuit 160. The output of gate 172 is applied to the input of addressing circuit 106.

In addition to developing the size information Σ, the logic unit 166 examines the density values $D_N$, $D_E$, $D_S$, $D_W$ to determine whether a shape different from a circle should be used. That is, in accordance with a preferred embodiment, the logic unit 166 will examine the individual density values to determine whether the dot character should have a shape as represented in FIG. 2c or 2d, for example. In an embodiment of the invention, this determination is made by examining the following relationships:

$$D_N + D_S > T \cdot \frac{\Sigma}{2} \text{ or } D_E + D_W > T \cdot \frac{\Sigma}{2}.$$

The first of the two cases represented by the foregoing relationships is represented in FIG. 2c. If the relationship is satisfied, that is, if $D_N$ approximately equals $D_S$ and if $D_N + D_S$ is substantially greater than $D_E + D_W$, then it is desired to select the vertically oriented halftone dot characters shown in FIG. 2c. If, on the other hand, the second relationship is satisfied, that is, if $D_E$ approximately equals $D_W$ and $D_E + D_W$ is much greater than $D_N + D_S$, it is desired that a halftone dot character as represented in FIG. 2d be created.

Since it has been assumed that the system is capable of producing three different character shapes, it is sufficient for the shape to be represented by two bits. After the logic unit 166 determines based upon the examination of the values $D_N$, $D_E$, $D_S$, $D_W$ as to which dot character shape should be presented, it supplies those two bits on output line 174 to the input of gate 176. Gate 176 is enabled by the flag detect circuit 160. The output of gate 176 is applied to addressing circuit 106. Thus, it should now be apparent that when a high detail cell is detected by flag detect circuit 160, the logic unit 166 operates upon the succeeding density values $D_N$, $D_E$, $D_S$, $D_W$ to determine the shape and size of the dot character to be drawn by the cathode ray tube 114. This determination results in the generation of bits on output lines 170 and 174 which are then used as an address by addressing circuit 106 to access the information from font memory 110 to draw the dot character of selected size and shape on the cathode ray tube.

In addition to determining the size and shape of the dot character to be presented by the cathode ray tube 114, the logic unit 166 determines whether the dot character should be displaced within the cell. This situation is represented in FIGS. 2e and 2f wherein the dot characters are shown as being displaced horizontally ($\Delta X$) and vertically ($\Delta Y$) within the cell in the replica. In accordance with a preferred embodiment, the dot character is migrated or displaced within a cell, in accordance with the following formulations $$\Delta X = \frac{L}{K_3} (D_N - D_S) \text{ and } \Delta Y = \frac{L}{K_4} (D_E - D_W)$$

where L represents the distance from the center of a cell to the center of one of said points and $K_3$ and $K_4$ each represents a constant.

The logic unit 166 provides digital representations of $\Delta X$ and $\Delta Y$ on output lines 180 and 182 respectively. These lines are coupled to the less significant bit input stages of the digital to analog converters 152 and 154 to thus effectively reposition the center of that particular cell to cause any character to be displayed to be offset or migrated from the predetermined cell position.

In accordance with one further aspect of the invention, an operator controlled translation table lookup means 190 may be optionally provided. The table lookup means 190, when provided, is coupled to the memory control circuit 112 for modifying, under operator control, the addresses provided by the primary address memory 108 to access the font memory 110. The purpose of the translation table lookup means 190 is to enable an operator to enhance shadow or highlight effects in the halftone replica produced on the film 100 and to essentially linearize the system from original image to the apparent effect of the produced halftone replica. More particularly, it will be recalled that the dot characters are stored in font memory (or at least the starting addresses stored in memory 108) in sequence of increasing or decreasing density so that the value of $\Sigma$ can be directly used as an address by the addressing circuit 106. This means that ideally, each value of $\Sigma$ will be quantized into one of 253 levels, in accordance with a preferred embodiment, and that one of 253 levels will be used to access a corresponding one of 253 differently-sized dot characters. In order to highlight certain effects or enhance certain types of image subject matter, it is not always desired that the relationship between the $\Sigma$ value and the dot character size be the same. That is, under some circumstances, it is able to effectively superimpose a desired non-linear equalization curve upon the values of $\Sigma$. For example, it may be desired that a $\Sigma$ value of 28 indeed access a dot character of size 28, but that a $\Sigma$ value of 32 access some dot character of a size different than size 32. The translation table lookup means 190 enables an operator to effectively introduce such an equalization curve. The translation table lookup means operates by responding to a primary address read out of memory 108 to provide a different address for accessing the font memory 110.

Figures 4A, 4B, 4C, 4D:
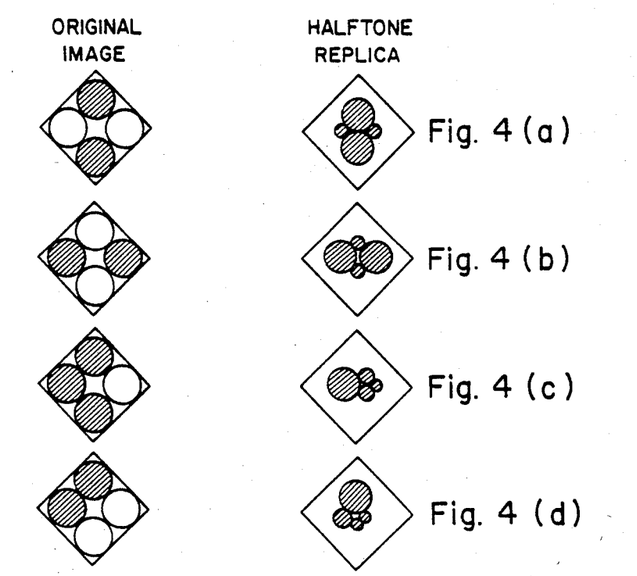
FIG. 4a schematically illustrates an exemplary halftone dot character formed to replicate the original image high detail cell shown, in accordance with an alternative embodiment of the invention.
FIG. 4b schematically illustrates a further exemplary halftone dot character formed to replicate the further high detail cell shown, in accordance with said alternative embodiment.
FIG. 4c schematically illustrates a still further exemplary halftone dot character formed to replicate the further high detail cell shown, in accordance with said alternative embodiment.
FIG. 4d schematically illustrates a still further exemplary halftone dot character formed to replicate the further high detail cell shown, in accordance with said alternative embodiment.

Attention is now directed to FIGS. 4a-4d which illustrate typical halftone dot characters to be printed on the replica in response to original image cells in accordance with an alternative embodiment of the invention. FIG. 4a illustrates an original image cell for which the following assumptions have been made:

$$D_N \approx D_S; D_E \approx D_W; D_N >> D_E.$$

The halftone replica, in accordance with the alternative embodiment, is comprised of four dot characters, or a dot character cluster, having four parts, each corresponding to one of the sample points in the original image. Thus, the halftone replica of FIG. 4a is illustrated as consisting of relatively large north and south dots corresponding to the north and south samples of the original image, and relatively small east and west dots, corresponding to the east and west samples of the original image. Note that the four dots of the halftone replica of FIG. 4a each lie within the same quadrant of the cell as does its corresponding sample from the original image cell. Although the dots of the replica of FIG. 4 have been depicted for clarity as being circular and tangential to one another, it should be understood that the dots may be differently shaped and may overlap one another near the center of the cell area.

FIG. 4b illustrates a further example of an original image cell in which the following assumptions have been made:

$$D_E \approx D_W; D_N \approx D_S; D_E >> D_N.$$

The foregoing assumptions for FIG. 4b result in a replica consisting of relatively large east and west dots and relatively small north and south dots.

FIG. 4c illustrates an original image cell for which the following assumptions have been made:

$$D_N \approx D_S; D_W > D_S > D_E.$$

As depicted in FIG. 4c, the replica is comprised of a relatively large west dot, smaller and substantially equal north and south dots and a relatively small east dot.

FIG. 4d illustrates an exemplary original image cell for which the following assumptions have been made:

$$D_E \approx D_S; D_N > D_W > D_S.$$

The assumptions for the original image cell of FIG. 4d result in a replica cell consisting of a relatively large north dot, a smaller west dot, and a considerably smaller east and south dot.

It should be appreciated that the halftone replicas illustrated in FIG. 4a-4d are similar to, but different in detail from those illustrated in FIGS. 2c-2f. The conversion of an original high detail cell into a particular replica, as exemplified in either FIG. 2 or FIG. 4, depends in part upon the type of image being converted. Thus, it has been learned that for certain applications, e.g. original images consisting of primarily gray tones, it may be appropriate to utilize one form of replication, as in FIG. 2, and for a different type of image, e,g. fine line art, it may be more suitable to use a slightly different replication technique, as represented in FIG. 4. Although the original image sample points and the replica dots in FIGS. 4a-4d are all depicted as circles, it should be understood that other shapes can be readily employed and the terms "points" and "dots" are not intended to identify any particular shape. For example only, it is recognized that the dots depicted in the replicas of FIGS. 4a–4d may appropriately comprise sectors or rectangles filling each quadrant outwardly from the cell center.

Figure 5:
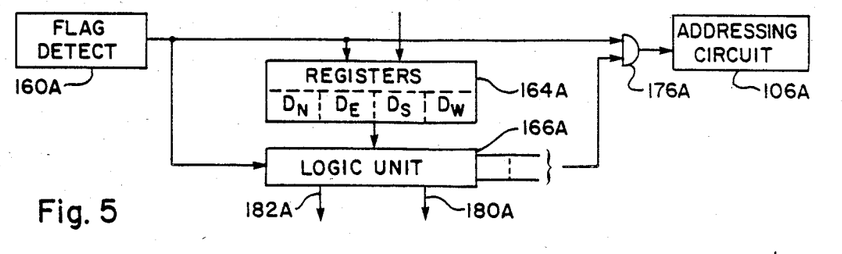
FIG. 5 is a block diagram illustrating a slight modification in the image record subassembly of FIG. 3 in accordance with an alternative embodiment of the invention.

Attention is now directed to FIG. 5 which depicts a slight modification in a portion of the image record subassembly of FIG. 3. Elements of FIG. 5 which are analogous to elements of FIG. 3 have been given similar designation numbers with the letter A appended thereto. Thus, FIG. 5 illustrates flag detect circuit 160A and registers 164A which are essentially identical to the similarly numbered elements of FIG. 3. Logic unit 164A is illustrated in FIG. 5 which may differ slightly from the logic unit 166 of FIG. 3 for the purpose of depicting the replica cells of FIG. 4 as contrasted with the replica cells of FIG. 2. The gate means 176A of FIG. 5 is intended to depict the gating for the multiple output lines of the logic unit 166A, similarly to the gates 172 and 176 of FIG. 3 which are intended to depict the output gating for the output lines from logic unit 166.

It will be recalled that it has been assumed that each of the sample values, $D_N$, $D_E$, $D_S$, and $D_W$ is defined by six bits. Thus, the registers 164A will store 24 bits for a high detail cell. If sufficient space were available in memory 108, all 24 bits stored in the register 164A could be utilized as an address, by addressing circuit 106A, to access locations from the memory 108. However, this would require that the memory 108 have $2^{24}$ addressable locations. Since this is an unreasonably large memory for most applications, it is desirable to provide a technique for accomplishing the conversion depicted in FIG. 4 without requiring such an unreasonably large memory 108.

Figure 6:
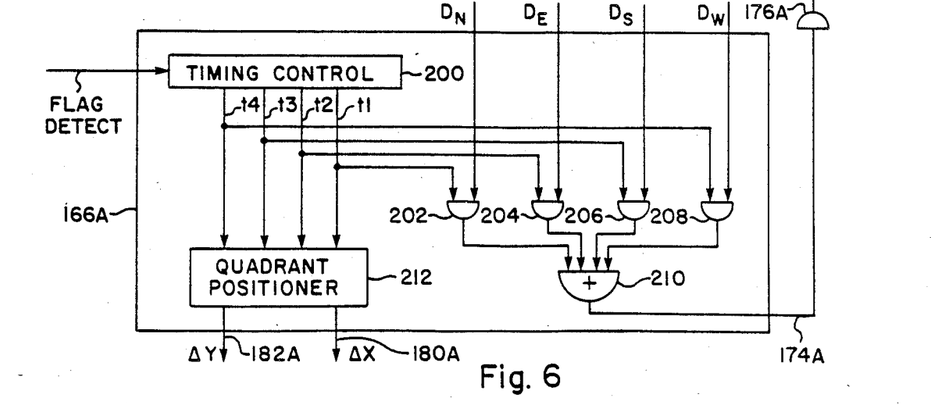
FIG. 6 is a block diagram of the logic unit of FIG. 5.

In accordance with the alternative embodiment of the invention, depicted in FIG. 6, the sample values, $D_N$, $D_E$, $D_S$, and $D_W$ are processed in sequence. Thus, the logic unit 166A need only address $2^6$ different locations in memory 108.

Attention is now directed to FIG. 6 which illustrates the details of logic unit 166A. More particularly, when the flag detect circuit 160 detects a high detail cell, it will provide a flag signal to timing control circuit 200 within the logic unit 166A. Timing control 200 then successively defines four successive time slots t1, t2, t3, t4 during which the north, east, south, and west samples, respectively, are processed. More particularly, the registers 164A are connected to the inputs of AND gates 202, 204, 206 and 208 which are respectively enabled during time slots t1, t2, t3, and t4. The outputs of gates 202, 204, 206, and 208 are connected to the input of OR gate 210 whose output (i.e. six bits) is applied to line 174A and then through gating 176A to the addressing circuit 106. Thus, during each time slot a six bit sample representing the density of a single quadrant of an original image high detail cell will address the memory 108 and the deflection circuitry will cause the CRT spot 116 to scan the appropriate cell quadrant during each time slot. For this purpose, a quadrant positioner circuit 212 is provided. The timing outputs from the timing control means 200 are connected to the input of the quadrant positioner 212. The quadrant positioner circuit 212 provides horizontal and vertical offset signals on lines 180A and 182A to the horizontal and vertical digital to analog converters 152 and 154. Thus, for example, during time slot t1 defined by the timing control means 200, the quadrant positioner circuit 212 will provide ΔX and ΔY values on lines 180A and 182A to cause the spot 116 to scan the north sector of the replica cell. Likewise, during time slots t2, t3, and t4 the spot 116 will be caused to scan within the east, south, and west quadrants of the replica cell.

From the foregoing, it should now be apparent that a photocomposing system has been disclosed herein having a halftone generating capability in which considerably enhanced halftone replicas can be developed requiring only a relatively small increase in data storage. The objectives of the invention are achieved by sampling the original image at a resolution greater than that desired for the halftone replica. Thus, in accordance with the preferred embodiments, each dot cell is sampled at four points rather than one point. Based upon these four samples, the image read subassembly determines whether the cell is a high or low detail cell. If the cell is a low detail cell, then the four samples are combined and the cell data is processed essentially as in prior art systems. If, on the other hand, the cell is a high detail cell, then the four samples are recorded in memory and the image record subassembly utilizes those four samples to select a particular (size and shape) halftone character and where it should be displayed within the cell. In an alternative embodiment, the four samples are used to select four separate dot characters with each being displayed within a different quadrant of the cell.

It should be understood that although specific embodiments of the invention have been disclosed herein, variations and modifications within the scope of the invention will readily occur to those skilled in the art, and consequently, it is intended that the claims be interpreted to cover such variations and modification. For example only, although it has been assumed that each cell is sampled at four individual points, the invention is not restricted to any particular number of points and indeed a greater number of sample points within a cell can be utilized. Further, although exemplary criteria for determining whether a cell is a high or low detail cell have been set forth, different criteria can be utilized. Thus, for example, ratios of density values within a cell, rather than differences, can be utilized to determine whether a cell is high detail. Similarly, different but related criteria can be utilized to determine the shape and size of the halftone character to be selected by the logic unit. Further, although a special-purpose hardwired embodiment of the invention has been disclosed herein, it should also be recognized that an equivalent embodiment of the invention can be readily implemented by a programmed general purpose computer.

What is claimed is:

1. A photocomposing system for producing a halftone replica of an original image comprising in combination:

means for scanning said original image to produce a digital representation of the tonal density of each of a plurality of points of said image;

comparison means for comparing digital representations of adjacent points within an area forming a cell for generating a "flag" signal when the differences in tonal density between said points exceeds a certain threshold;

arithmetic means responsive to the digital representations of points within a cell for producing a single digital weighted value for that cell;

dot character storage means storing a plurality of different halftone dot characters;

means responsive to each digital weighted value for selecting one of said halftone dot characters from said dot character storage means;

output means responsive to each halftone dot character selected for producing a visible representation of that dot character positioned at substantially the center of a cell area; and means responsive to the generation of a "flag" signal associated with a cell for altering the horizontal and vertical positions of the visible representation produced in the area of that cell.

2. The photocomposing system of claim 1 wherein said arithmetic means includes means for arithmetically averaging the digital representation of points within a cell to produce said single digital weighted value.

3. The photocomposing system of claim 1 wherein said dot character storage means stores dot characters of different size and shape.

4. The photocomposing system of claim 1 wherein each of said cells contains four points successively displaced by 90° from one another and wherein the tonal densities of said four points are respectively represented by $D_N$, $D_E$, $D_S$, $D_W$ and wherein said comparison means generates said "flag" signal if the tonal density of any one of said four point differs by more than a threshold value from the tonal density of any other one of said points.

5. The photocomposing system of claim 1 wherein each of said cells contains four points successively displaced by 90° from one another and wherein the tonal densities of said four points are respectively represented by $D_N$, $D_E$, $D_S$, $D_W$ and wherein said arithmetic means for producing said weighted value includes means responsive to $$D_N + D_S > > \frac{\Sigma}{2} \text{ or } D_E + D_W > > \frac{\Sigma}{2}$$

where $\Sigma = K (D_N + D_E + D_S + D_W)$ where K represents a constant.

6. The photocomposing system of claim 1 wherein each of said cells contains four points successively displaced by 90° from one another and wherein the tonal densities of said four points are respectively represented by $D_N$, $D_E$, $D_S$, $D_W$ and wherein said means for altering the horizontal and vertical positions include means for altering the horizontal position $\Delta X$ proportional to $L (D_N - D_S)$ and the vertical position $\Delta Y$ porportional to $L(D_E - D_N)$ where L represents the distance from the center of a cell to the center of one of said points.

7. A photocomposing system for producing a halftone replica of an original image comprising in combination:

means for scanning said original image to produce a digital representation of the tonal density of each of a plurality of points of said image;

comparison means for comparing digital representations of adjacent points within an area forming a cell for generating a "flag" signal when the differences in tonal density between said points exceeds a certain threshold, each of said cells containing four points successively displaced by 90° from one another, the tonal densities of said four points beings respectively represented by $D_N$, $D_E$, $D_S$, $D_W$;

arithmetic means responsive to the digital representations of points within a cell for producing a single digital weighted value for that cell, said digital value being dependent upon $\Sigma$ and $\Sigma$ is proportional to the sum of $D_N + D_E + D_S + D_W$;

dot character storage means storing a plurality of different halftone dot characters of different size and shape;

means responsive to each digital weighted value for selecting one of said halftone dot characters from said dot character storage means;

output means responsive to each halftone dot character selected for producing a visible representation of that dot character positioned at substantially the center of a cell area.

8. The photocomposing system of claim 7 wherein said digital value produced by said arithmetic means is further responsive to the relationship of $D_N + D_S$ compared to $D_E + D_W$.

9. A method for producing a halftone replica of an original image comprising the steps of:

scanning said original image to derive a digital representation of the tonal density at each of a plurality of points;

comparing digital representations of tonal density of adjacent points defining a cell area to ascertain whether the difference therebetween exceeds threshold so as to identify a high detail cell or is less than said threshold so as to identify a low detail cell;

selecting for each cell area a particular one of a plurality of stored dot characters in accordance with the values of the digital representations of points within that cell area; and displaying each of said selected dot characters on an output medium at a certain position within the cell area of low detail cells and at a variable position within the cell area of high detail cells which position is dependent upon the digital representations of points within that cell area.

10. A photocomposing system for producing a halftone replica of an original image comprising in combination:

means for scanning said original image to produce a digital representation of the tonal density of each of a plurality of points of said image;

comparison means for comparing digital representations of adjacent points within an area forming a cell to identify a cell as being of either high or low detail;

arithmetic means responsive to the digital representations of points within a cell for producing a single digital weighted value for that cell;

dot character storage means storing a plurality of different halftone dot characters;

means responsive to each digital weighted value for selecting one of said halftone dot characters from said dot character storage means;

output means responsive to each halftone dot character selected for producing a visible representation of that dot character positioned at substantially the center of a cell area; and means responsive to said comparison means determining a cell is of high detail for altering the horizontal and vertical positions of the visible representation produced in the area of that cell.

11. A photocomposing system for producing a halftone replica of an original image comprising in combination:

means for scanning said original image to produce a digital representation of the tonal density of each of a plurality of points of said image;

comparison means for comparing digital representations of adjacent points within an area forming a cell to identify a cell as being of either high or low detail;

a digital memory:

arithmetic means responsive to the identification of a low detail cell for processing the digital representations of the points therein to produce a single digital weighted value for that cell;

means for storing said single digital weighted value in said digital memory;

means responsive to the identification of a high detail cell for storing the digital representations of each of the points therein in said digital memory;

dot character storage means storing a plurality of different halftone dot characters;

means for accessing said digital memory;

means responsive to the accessing of a digital weighted value associated with a low detail cell for selecting one of said halftone dot characters from said dot character storage means;

means responsive to the accessing of digital representation of points within a high detail cell for selecting one of said halftone dot characters from said dot character storage means;

output means responsive to each halftone dot character selected for producing a visible representation of that dot character positioned at substantially the center of a cell area; and means responsive to the accessed digital reoresentations associated with a high detail cell for altering the horizontal and/or vertical position of the visible representation produced in the area of that cell.

12. The photocomposing system of claim 11 wherein each of said cells contains four points successively displaced by 90° from one another and wherein the tonal densities of said four points are respectively represented by $D_N$, $D_E$, $D_S$, $D_W$ and wherein said comparison means identifies a cell as being of high detail if the tonal density of any one of said four points differs by more than a threshold value from the tonal density of any other one of said points.

13. The photocomposing system of claim 11 wherein each of said cells contains four points successively displaced by 90° from one another and wherein the tonal densities of said four points are respectively represented by $D_N$, $D_E$, $D_S$, $D_W$, and wherein said means responsive to the accessing of digital representations of points within a high detail cell includes means responsive to $$D_N + D_S >> \frac{\Sigma}{2} \text{ or } D_E + D_W >> \frac{\Sigma}{2}$$

where $\Sigma = K (D_N + D_E + D_S + D_W)$ where K represents a constant.

14. The photocomoosing system of claim 11 wherein each of said cells contains four points successively displaced by 90° from one another and wherein the tonal densities of said four points are respectively represented by $D_N$, $D_E$, $D_S$, $D_W$ and wherein said means for altering the horizontal positio $\Delta X$ proportional to L $(D_N - D_S)$ and the vertical position $\Delta Y$ proportional to L $(D_E - D_N)$ where L represents the distance from the center of a cell to the center of one of said points.

15. In a photocomposing system for producing a halftone replica of an original image, an image read subassembly comprising:

means for scanning an original image to produce a digital representation of the tonal density of each of a plurality of points of said image;

comparison means for comparing digital representations adjacent points within a cell area of said image to identify a cell as being of either high or low detail;

a digital memory;

means responsive to the indentification of a low detail cell for processing the digital representations of the points therein to produce a single digital weighted value for that cell;

means for storing said single digital weighted value in said digital memory;

means responsive to the identification of a high detail cell for storing the digital representations of each of the points therein in said digital memory.

16. In a photocomposing system for producing a halftone replica of an original image in response to data stored in a digital memory representing a low detail cell in the form of a single digital weighted value and a high detail cell in the form of multiple digital representations of adjacent points within a cell area, an image record subassembly comprising:

dot character storage means storing a plurality of different halftone dot characters;

means for accessing said digital memory;

means responsive to the accessing of a digital weighted value representative of a low detail cell for selecting one of said halftone dot characters from said dot character storage means;

means responsive to the accessing of multiple digital representations representative of a high detail cell for selecting one of said halftone dot characters from said dot character storage means;

output means responsive to each halftone dot character selected for producing a visible representation of that dot character positioned at substantially the center of a cell area; and means responsive to the accessing of digital representations associated with a high detail cell for altering the horizontal and/or vertical position of the visible representation produced in the area of that cell.

17. A photocomposing system for producing a halftone replica of an original image comprising in combination:

means for scanning said original image to produce a digital representation of the tonal density of each of a plurality of points of said image;

comparison means for comparing digital representations of adjacent points within an area of said original image forming a cell to identify each cell as being of either high or low detail;

a digital memory;

arithmetic means responsive to the identification of a low detail cell for processing the digital representations of the points therein to produce a single digital weighted value for that cell;

means for storing said single digital weighted value in said digital memory;

means responsive to the identification of a high detail cell for storing the digital representations of each of the points therein in said digital memory;

dot character storage means storing a plurality of different halftone dot characters;

means for accessing said digital memory;

means responsive to the accessing of a digital weighted value associated with a low detail cell for selecting one of said halftone dot characters from said dot character storage means;

means responsive to the accessing of digital representations of points within a high detail cell for selecting one or more of said halftone dot characters from said dot character storage means; and output means responsive to each halftone dot character selected for producing a visible representation of that dot character within a cell area of said replica.

18. The system of claim 17 wherein said means responsive to the accessing of digital representations of points within a high detail cell includes means for selecting one of said halftone dot characters in response to the digital representation of each such point.

19. The system of claim 18 wherein said output means includes means for positioning each visible representation of a point within a high detail cell within said replica cell area at a location corresponding to the location of the point within the high detail cell of said original image.

20. In a photocomposing system for producing a halftone replica of an original image in response to data stored in a digital memory representing a low detail cell in the form of a single digital weighted value and a high detail cell in the form of multiple digital representations of adjacent points within a cell area of said original image, an image record subassembly comprising:

dot character storage means storing a plurality of different halftone dot characters;

means for accessing said digital memory;

means responsive to the accessing of a digital weighted value representative of a low detail cell for selecting one of said halftone dot characters from said dot character storage means;

means responsive to the accessing of multiple digital representations representative of a high detail cell for selecting one or more of said halftone dot characters from said dot character storage means; and output means responsive to each halftone dot character selected for producing a visible representation of that dot character positioned within a cell area of said replica.

21. The system of claim 20 wherein said means responsive to the accessing of multiple digital representations representative of a high detail cell includes means for selecting one of said halftone dot characters in response to each such accessed digital representation.

22. The system of claim 21 wherein said output means includes means for positioning each visible representation of a point within a high detail cell within said replica cell area at a location related to the location of the point within the high detail cell of said original image.

* * * * *